United States Patent
Ogawa et al.

(10) Patent No.: US 7,078,009 B2
(45) Date of Patent: Jul. 18, 2006

(54) LEPIDOCROCITE TYPE LITHIUM POTASSIUM TITANATE, METHOD FOR PREPARATION THEREOF, AND FRICTION MATERIAL

(75) Inventors: Hiroshi Ogawa, Tokushima (JP); Nobuki Itoi, Tokushima (JP); Kousuke Inada, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 294 days.

(21) Appl. No.: 10/493,468

(22) PCT Filed: Oct. 28, 2002

(86) PCT No.: PCT/JP02/11165

§ 371 (c)(1),
(2), (4) Date: Apr. 23, 2004

(87) PCT Pub. No.: WO03/037797

PCT Pub. Date: May 8, 2003

(65) Prior Publication Data

US 2004/0253173 A1 Dec. 16, 2004

(30) Foreign Application Priority Data

Oct. 29, 2001 (JP) .............................. 2001-331121

(51) Int. Cl.
*C01G 23/00* (2006.01)
*C09K 3/14* (2006.01)
*F16D 69/02* (2006.01)

(52) U.S. Cl. .............. 423/593.1; 423/598; 423/594.15; 423/71; 423/84; 423/179; 423/179.5; 423/202; 106/36; 508/108

(58) Field of Classification Search ............. 423/593.1, 423/598, 594.15, 71, 84, 179, 179.5, 202; 106/36; 508/108
See application file for complete search history.

(56) References Cited

U.S. PATENT DOCUMENTS

| 6,355,601 B1 * | 3/2002 | Takenaka et al. ........... 508/108 |
| 6,432,187 B1 * | 8/2002 | Ogawa et al. ................ 106/36 |
| 6,677,041 B1 * | 1/2004 | Ogawa et al. ............. 428/402 |

FOREIGN PATENT DOCUMENTS

| EP | 1170 257 A1 | 9/2002 |
| JP | 3027577 | * 1/2000 |
| JP | 2000-230168 | 8/2000 |
| JP | 2000-344520 | 12/2000 |
| WO | 99/11574 | 3/1999 |

* cited by examiner

*Primary Examiner*—Stanley S. Silverman
*Assistant Examiner*—Timothy C. Vanoy
(74) *Attorney, Agent, or Firm*—Townsend & Banta

(57) ABSTRACT

Lepidocrocite lithium potassium titanate characterized as having a composition represented by the formula $K_{0.5-0.7}Li_{0.27}Ti_{1.73}O_{3.85-3.95}$, and preferably having an arithmetic mean of major and minor diameters of 0.1–100 μm, a proportion of a major to minor diameter of from 1 to below 10, a mean thickness of 50–5,000 nm and a flaky shape. A friction material characterized as containing 1–80% by weight of the lepidocrocite lithium potassium titanate as a friction control agent.

6 Claims, 1 Drawing Sheet

LEPIDOCROCITE TYPE LITHIUM POTASSIUM TITANATE, METHOD FOR PREPARATION THEREOF, AND FRICTION MATERIAL

TECHNICAL FIELD

This invention relates to lepidocrocite lithium potassium titanate, a method for manufacturing the same and a friction material.

BACKGROUND ART

Friction materials as heretofore used to form braking members utilize asbestos in the form of being dispersed in and integrated by organic or inorganic binders. However, these show insufficient heat resistance and frictional wear properties, e.g., friction coefficient and wear resistance, that tend to drop in the high-temperature range, resulting in the increased occurrence of a fading phenomenon when braking is effected. When braking is effected, the contact of such friction materials with a high-speed brake disc causes the frequent occurrence of braking noise. Also, asbestos is a known cancer-causing substance and is readily made into dusts. In view of the environmental hygienic problem that workers may inhale asbestos during operation, the use of asbestos has been increasingly self-restrained. Under these circumstances, it has been strongly demanded to develop asbestos substitutes.

In response to such demands, friction materials using non-carcinogenic potassium titanate fibers as a friction control agent have been proposed and achieved a widespread use for incorporation primarily in automobile braking pads. The friction materials containing potassium titanate fibers exhibit superior sliding properties and good braking effect. Nevertheless, they provide little damage to braking discs, which is a very favored advantage thereof. However, they suffer from insufficient wear resistance, particularly in the high-temperature range, and a slightly faster wear rate. Also, they have not yet offered a sufficient solution to braking noise developed in braking devices. Further, the potassium titanate fibers, because of their fibrous form, are bulky and poor in flowability, leading to their tendency to deposit on a wall of a feed passage and block the passage during manufacture of friction materials, which has been a problem.

Japanese Patent Registration No. 3027577 describes the utility of lepidocrocite lithium potassium titanate as a friction control agent for friction materials. Such friction materials exhibit stable frictional wear properties in the low- to high-temperature ranges.

DISCLOSURE OF THE INVENTION

It is an object of the present invention to provide novel lepidocrocite lithium potassium titanate useful for a friction control agent, a method for manufacturing the same and a friction material containing the same.

Lepidocrocite lithium potassium titanate of the present invention (hereinafter abbreviated as KTLO unless otherwise particularly specified) is represented by the formula $K_{0.5-0.7}Li_{0.27}Ti_{1.73}O_{3.85-3.95}$.

KTLO of the present invention preferably has an arithmetic mean of major and minor diameters in the range of 0.1–100 μm, a proportion of a major to minor diameter of from 1 to below 10 and a thickness in the range of 50–5,000 nm, and exists in the form of flakes.

KTLO of the present invention has a layer structure and shows stable heat resistance and frictional wear properties regardless of temperature. Also, since it does not exist in a fibrous form, unlike potassium titanate fibers, it is very unlikely to block a feed passage during manufacture and worsen a working environment due to the presence of respirable fibers.

The manufacturing method of the present invention can manufacture KTLO of the present invention and is characterized as including the steps of adding an acid to an aqueous slurry of lepidocrocite lithium potassium titanate having a composition represented by the formula $K_{0.8}Li_{0.27}Ti_{1.73}O_4$ while adjusting the slurry to a pH of 6–8, separating solids from the slurry and then calcining the solids.

The friction material of the present invention is characterized as containing KTLO of the present invention as a friction control agent. The friction material of the present invention contains KTLO of the present invention as the friction control agent and thus is able to exhibit extremely stable frictional wear properties (such as friction resistance and frictional coefficients) over the low- to high-temperature ranges. Their frictional wear properties are maintained extremely stable even during a long-term use over several tens hours.

Accordingly, the use of the friction material of this invention for braking members, e.g., clutch facings, brake linings and disc pads incorporated in braking devices as of automobiles, railway vehicles, aircrafts and industrial apparatuses not only improves and stabilizes their braking functions but also extends their service lives.

The reason why the friction materials of the present invention provide such superior results is not clear but presumably attributed to the structural difference between KTLO of the present invention and prior art lepidocrocite lithium potassium titanate (hereinafter abbreviated as KTLO-a unless otherwise particularly specified) represented by the composition $K_{0.8}Li_{0.27}Ti_{1.73}O_4$.

The lepidocrocite lithium potassium titanate (KTLO) of the present invention generally has a composition represented by the formula:

$$K_{0.5-0.7}Li_{0.27}Ti_{1.73}O_{3.85-3.95} \tag{1}$$

and has a potassium content within the range of 0.5–0.7 moles.

KTLO of the present invention has an orthorhombic layer structure and generally has a flake or sheetlike shape as similar to mica, pulverized pieces of shells and the like.

An arithmetic mean of major and minor diameters ((major diameter+minor diameter)/2), a proportion of a major to minor diameter (major diameter/minor diameter) and a mean thickness for KTLO of the present invention spread over a wide range of values and may be suitably chosen depending upon the end use contemplated. In order to impart satisfactory heat resistance and sliding properties to friction materials containing KTLO as friction control agent, KTLO may be used having an arithmetic mean of major and minor diameters generally in the approximate range of 0.1–100 μm, preferably in the approximate range of 1–30 μm, a proportion of a major to minor diameter of from 1 to below 10, preferably from 1 to below 5, and a thickness generally in the range of 50–5,000 nm, preferably in the range of 200–2,000 nm. These values are determined by an electron microscope. The particularly preferred KTLO has an arithmetic mean of major and minor diameters generally in the approximate range of 0.1–100 μm, a proportion of a major to minor diameter of from 1 to below 10 and a thickness generally in the range of 50–5,000 nm, and exists in the form of flakes.

KTLO of the present invention can be manufactured, for example, by adding an acid to an aqueous slurry of KTLO-a, mixing them, separating solids from the slurry and calcining the solids.

KTLO-a can be obtained, for example, by mixing sources of titanium, potassium and lithium, adding a flux and, subsequnet to thorough mixing, calcining the mixture at a temperature of 1,000–1,100° C. for a period of 1–8 hours.

The titanium source can be optionally chosen from titanium oxide-containing compounds, specific examples of which include titanium oxide, rutile ore, titanium hydroxide wet cake, water-containing titania and the like. Such titanium sources may be used alone or in combination. The potassium source can be chosen from compounds which produce potassium oxide when exposed to heat, specific examples of which include potassium oxide, potassium carbonate, potassium hydroxide, potassium nitrate and the like. Such potassium sources may be used alone or in any combination. Also, the potassium source may be used in combination with a small amount of one or more of oxides, carbonates, hydroxides and nitrates of any other alkaline metal. Examples of lithium sources include lithium hydroxide, lithium carbonate, lithium fluoride and the like. Such lithium sources may be used alone or in any combination.

The titanium, potassium and lithium sources are mixed in the standard ratio of Ti:K:Li=1.73:0.8:0.27 (molar ratio), with each being permitted to deviate within about 5%. However, a large deviation from the specified ratio sometimes results in the unfavorable deposition of side products, $Li_2TiO_3$ and/or $K_2Ti_6O_{13}$ which are not sheetlike.

Examples of fluxes include potassium chloride, potassium fluoride, potassium molybdenate, potassium tangstenate and the like. Among those fluxes, potassium chloride is particularly preferred. The flux is added to the raw material in the molar ratio (raw material:flux) of 3:1–3:15, preferably 3:3.5–3:10. Lower loadings of the flux increase an economical advantage. However, if the flux loading is excessively low, the unfavorable collapse of a sheetlike crystal may result.

Calcination can be achieved using an optional technique such as an electric furnace, muffle furnace or the like. In the mass production, a tunnel kiln may preferably be used to calcine the raw material previously pressed into a bricklike or cylindrical shape. Preferably, calcination is performed at a temperature between 1,000–1,100° C. for a retention period of 1–24 hours. Temperature may be raised or lowered at any rate, but generally preferably at 3–7° C./min. The higher calcination temperatures result in larger-scale sheetlike products. However, if it exceeds 1,100° C., the product shape may be impaired due to fusion, which is an unfavorable result. The longer retention period increases the size of resulting particles. After calcination, the product may be wet disintegrated. Specifically, it may be crushed and ground using a jaw crusher, a bin mill and the like, dispersed in water and stirred in the form of a 5–10 wt. % slurry. When needed, this slurry may be further subjected to a sequence of classifying, filtering and drying to obtain a sheetlike lithium potassium titanate.

The concentration of the aqueous slurry of KTLO-a is not particularly specified and may be suitably chosen from a wide range. In view of workability, the aqueous slurry may be maintained at a concentration of about 1–30 weight %, preferably about 2–15 weight %.

The acid used is not particularly specified in type and can be chosen from known acids, examples of which include inorganic acids such as sulfuric acid, hydrochloric acid and nitric acid; organic acids such as acetic acid; and the like. Such acids may be used in combination, when needed. The acid may be added to the aqueous slurry in the effective amount to maintain the aqueous slurry at a pH of 6–8, preferably at a pH of 6.5–7.5. The pH measurement of the aqueous slurry is performed after addition of the acid and following about 1–5 hours of stirring. The acid is generally used in the form of an aqueous solution. The concentration of the aqueous acid solution is not particularly specified and may be suitably chosen from a wide range. It may be generally maintained in the approximate range of 1–80 weight %.

After the pH of the aqueous slurry is adjusted to fall within the above-specified range, the solids present therein is separated by a conventional separating means such as filtering, centrifuging or the like. The separated solids may be washed with water, if necessary.

The solids are then calcined. Generally, calcination is carried out at a temperature of about 400–700° C. and completes after about 1–12 hours. After calcination, the resulting powder may be pulverized or passed through a screen for disintegration.

The above-described procedure results in obtaining KTLO of the present invention. The present invention also provides a friction material containing KTLO as a friction control agent. The friction material of the present invention contains a binder and a friction control agent as essential components.

Any binder which is conventionally used in the friction material field can be used. Examples of binders include organic binders and inorganic binders. Examples of organic binders include thermosetting resins such as a phenol resin, formaldehyde resin, melamine resin, epoxy resin, acrylic resin, aromatic polyester resin and urea resin; elastomers such as a natural rubber, nitrile rubber, butadiene rubber, styrene butadiene rubber, chloroprene rubber, polyisoprene rubber, acrylic rubber, high styrene rubber and styrene propylene diene copolymer; thermoplastic resins such as a polyamide resin, polyphenylene sulfide resin, polyether resin, polyimide resin, polyether ether ketone resin and thermoplastic liquid crystal polyester resin; and the like. Examples of inorganic binders include an alumina sol, silica sol, silicone resins and the like. The above-listed binders may be used alone or in any combination, if compatible.

Used for a friction control agent is KTLO of the present invention as represented by the above-specified formula (1).

The friction material of the present invention may further contain a fibrous substance. Any fibrous substance which has been conventionally used in the art is applicable. Examples of fibrous substances include resin fibers such as aramid fiber, metal fibers such as steel and brass fibers, carbon fibers, glass fibers, ceramic fibers, rock wool, wood pulp and the like. These fibrous substances may be used alone or in combination. Also, these fibrous substances may be subjected to a surface treatment using a silane coupling agent such as an aminosilane, epoxysilane or vinylsilane coupling agent, a titanate coupling agent, phosphate ester or the like, for purposes as of improving their dispersion properties and adhesion to binders.

The friction material of the present invention may also contain a friction control agent conventionally used in the art, within the range that does not impair the favored properties of the friction material, examples of which include organic powders such as natural or synthetic rubber powders, either vulcanized or unvulcanized, cashew resin powders, resin dusts and rubber dusts; inorganic powders such as carbon black, graphite powder, molybdenum disulfide, barium sulfate, calcium carbonate, clay, mica, talc, diatomite, antigorite, sepiolite, montmorillonite, zeolite, sodium trititanate, sodium hexatitanate, potassium hexatitanate and potassium octatitanate; metal powders such as copper, aluminum, zinc and iron; oxide powders such as alumina, silica, chromium oxide, titanium oxide and iron oxide; and the like. These conventional friction control agents may be used alone or in any combination thereof.

The friction material of the present invention may further contain one or more of a rust-preventive agent, lubricant and abrasive.

The components of the friction material of the present invention can be blended in the proportions that can be suitably chosen from a wide range depending upon various conditions including the types of the binder, optional fibrous substance, conventional friction control agent and other additives used, the sliding and mechanical properties sought for the resulting friction materials, the end uses contemplated and the like. Generally, the friction material may contain 5–60 weight % (preferably 10–40 weight %) of a binder, 1–80 weight % (preferably 3–50 weight %) of a friction control agent (inclusive of a conventional friction control agent), up to 60 weight % (preferably 1–40 weight %) of a fibrous substance and up to 60 weight % of other additives, based on the total amount of the friction material.

The preferred friction material contains the fibrous substance, together with the binder and friction control agent, as essential components.

The friction material of the present invention can be manufactured by various techniques known in the art as being useful for manufacture of friction materials. To illustrate one technique, a fibrous substance, if needed, is dispersed in a binder, a friction control agent and other optional components are subsequently added to the binder, either as a mixture or separately, and the resulting mixture is brought into a mold where it is integrated by application of heat and pressure.

Alternatively, a technique may be used whereby the binder is melt kneaded in a twin screw extruder into which the friction control agent, optional fibrous substance and other components, either as a mixture or separately, are fed through a hopper and the resulting extrudate is machined into a desired shape.

Also alternatively, a technique can be used whereby the fibrous substance, if necessary, is dispersed in the binder to which the friction control agent and other optional components are subsequently added to form a mixture, the mixture is dispersed such as in water and wet laid on a net and then dewatered into a sheet, the sheet is pressed and heated for integration by a press machine, and the resulting product is properly cut and polished into a desired shape.

BEST MODES FOR CARRYING OUT THE INVENTION

Figure 1:
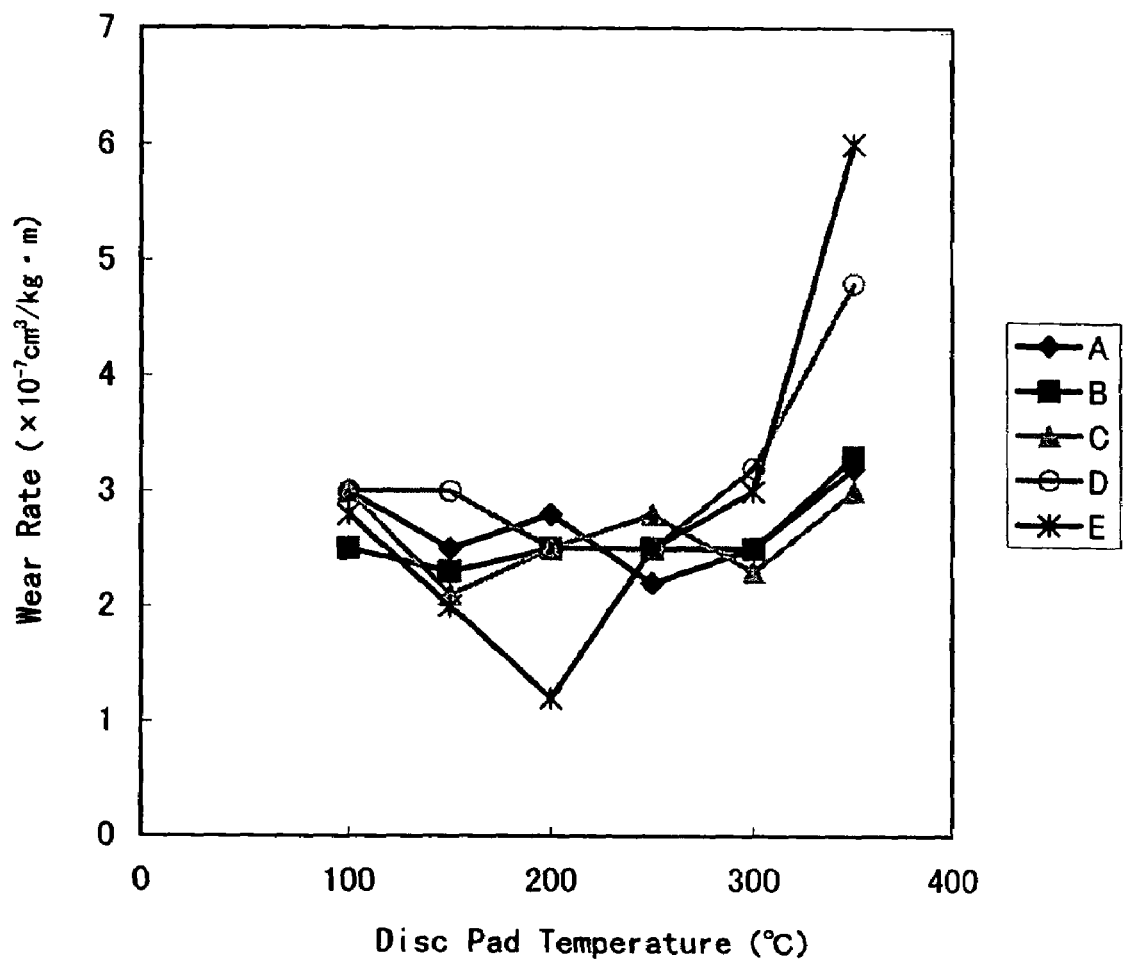
FIG. 1 is a graph showing a relationship between a disc pad temperature and a wear rate for the disc pads A–E.

The following Examples, Comparative Examples and Test Examples specifically illustrate the present invention. In the Examples, "parts" and "%" mean "parts by weight" and "% by weight", respectively.

EXAMPLE 1

(1) Synthesis of KTLO-a 67.01 kg of titanium oxide, 26.78 kg of potassium carbonate, 12.04 kg of potassium chloride, 5.08 kg of lithium hydroxide and further 10 liters of water as a binder were mixed. The mixture was pressed at a pressure of 14.7 MPa into a block shape by a hydropressing machine (manufactured by Yamamoto Tekkosho, Co., Ltd.). This block was calcined at 1,050° C. for 1 hour in an electric furnace (manufactured by Advantech Toyo Co., Ltd.) and then cooled gradually. The calcined product was pulverized to obtain a white powder with an arithmetic mean of major and minor diameters of 22 μm, a mean thickness of 2 μm and a proportion of a major to minor diameter of 3. The X-ray diffraction chart of the white powder was found to correspond to those given in ICDD card No. 25-1353 ($K_xLi_xTi_{2-0.5x}O_8$). The powder was also identified as having a composition of $K_{0.8}Li_{0.27}Ti_{1.73}O_4$ by ICP-AES analysis.

(2) Synthesis of KTLO ($K_{0.6}Li_{0.27}Ti_{1.73}O_{3.9}$) of the Present Invention The above-obtained KTLO-a was used to prepare 79.2 liters of a 10.9% aqueous slurry to which 4.7 kg of a 10% aqueous solution of sulfuric acid was subsequently added. The slurry was stirred for 2 hours and then adjusted to a pH of 7.0. This aqueous slurry was subjected to treatment by a centrifugal separator. The resulting cake (solids) was dispensed, dried at 110° C. for 5 hours and then calcined at 600° C. for 12 hours in an electric furnace. The calcined product was cooled gradually and then passed through a 20 mesh screen to obtain a white powder with an arithmetic mean of major and minor diameters of 22 μm, a mean thickness of 2 μm and a proportion of a major to minor diameter of 3. The white powder was identified as having a composition of $K_{0.6}Li_{0.27}Ti_{1.73}O_{3.9}$ by ICP-AES analysis. It is therefore evident that KTLO of the present invention is a compound clearly distinct from KTLO-a.

(3) Synthesis of KTLO ($K_{0.5}Li_{0.27}Ti_{1.73}O_{3.85}$) of the Present Invention The above-obtained KTLO-a was used to prepare 79.2 liters of a 10.9% aqueous slurry to which 6.3 kg of a 10% aqueous solution of sulfuric acid was subsequently added. The slurry was stirred for 2 hours and then adjusted to a pH of 6.0. This aqueous slurry was subjected to treatment by a centrifugal separator. The resulting cake (solids) was dispensed, dried at 110° C. for 5 hours and then calcined at 600° C. for 12 hours in an electric furnace. The calcined product was cooled gradually and then passed through a 20 mesh screen to obtain a white powder with an arithmetic mean of major and minor diameters of 22 μm, a mean thickness of 2 μm and a proportion of a major to minor diameter of 3. The white powder was identified as having a composition of $K_{0.5}Li_{0.27}Ti_{1.73}O_{3.85}$ by ICP-AES analysis. It is therefore evident that KTLO of the present invention is a compound clearly distinct from KTLO-a.

(4) Synthesis of KTLO ($K_{0.7}Li_{0.27}Ti_{1.73}O_{3.95}$) of the Present Invention The above-obtained KTLO-a was used to prepare 79.2 liters of a 10.9% aqueous slurry to which 1.2 kg of a 10% aqueous solution of sulfuric acid was subsequently added. The slurry was stirred for 2 hours and then adjusted to a pH of 8.0. This aqueous slurry was subjected to treatment by a centrifugal separator. The resulting cake (solids) was dispensed, dried at 110° C. for 5 hours and then calcined at 600° C. for 12 hours in an electric furnace. The calcined product was cooled gradually and then passed through a 20 mesh screen to obtain a white powder with an arithmetic mean of major and minor diameters of 22 µm, a mean thickness of 2 µm and a proportion of a major to minor diameter of 3. The white powder was identified as having a composition of $K_{0.7}Li_{0.27}Ti_{1.73}O_{3.95}$ by ICP-AES analysis. It is therefore evident that KTLO of the present invention is a compound clearly distinct from KTLO-a.

EXAMPLE 2

20 parts of KTLO obtained in Example 1, 10 parts of aramid fibers (product name: Kevlar Pulp, a means fiber length of 3 mm), 20 parts of a phenol resin (binder) and 50 parts of barium sulfate were mixed. The mixture was preformed at a pressure of 29.4 MPa at an ambient temperature for 1 minute, integrated in a mold at a pressure of 14.7 MPa at a temperature of 170° C. for 5 minutes and heat-treated at 180° C. for subsequent 3 hours. The molded product was removed from the mold and polished to fabricate each disc pad A to C (JIS D 4411 test piece).

COMPARATIVE EXAMPLE 1

The procedure of Example 2 was followed to fabricate a disc pad D, except that KTLO-a was used in the place of KTLO.

COMPARATIVE EXAMPLE 2

The procedure of Example 2 was followed to fabricate a disc pad E, except that 30 parts of potassium hexatitanate fibers (having a section diameter of 5–10 µm and an aspect ratio of 5) were used in the place of 30 parts of KTLO and aramid fibers.

TEST EXAMPLE 1: FRICTIONAL WEAR TEST

For the disc pads A to E, a constant-rate frictional wear test (friction disc surface: made of FC 25 graycast iron, surface pressure: 0.98 MPa, friction speed: 7 m/sec) was conducted according to the standards described in JIS D 4411 Automobile Friction Lining to measure a wear rate (cm³/kgm) and a friction coefficient (µ). The results are given in FIGS. 1 and 2.

Friction control agents contained in disc pads A to E are listed below.

Disc Pad A: KTLO ($K_{0.5}Li_{0.27}Ti_{1.73}O_{3.85}$)
Disc Pad B: KTLO ($K_{0.6}Li_{0.27}Ti_{1.73}O_{3.9}$)
Disc Pad C: KTLO ($K_{0.7}Li_{0.27}Ti_{1.73}O_{3.95}$)
Disc Pad D: KTLO-a ($K_{0.8}Li_{0.27}Ti_{1.73}O_4$)
Disc Pad E: potassium hexatitanate fiber ($K_2Ti_6O_{13}$)

Figure 2:
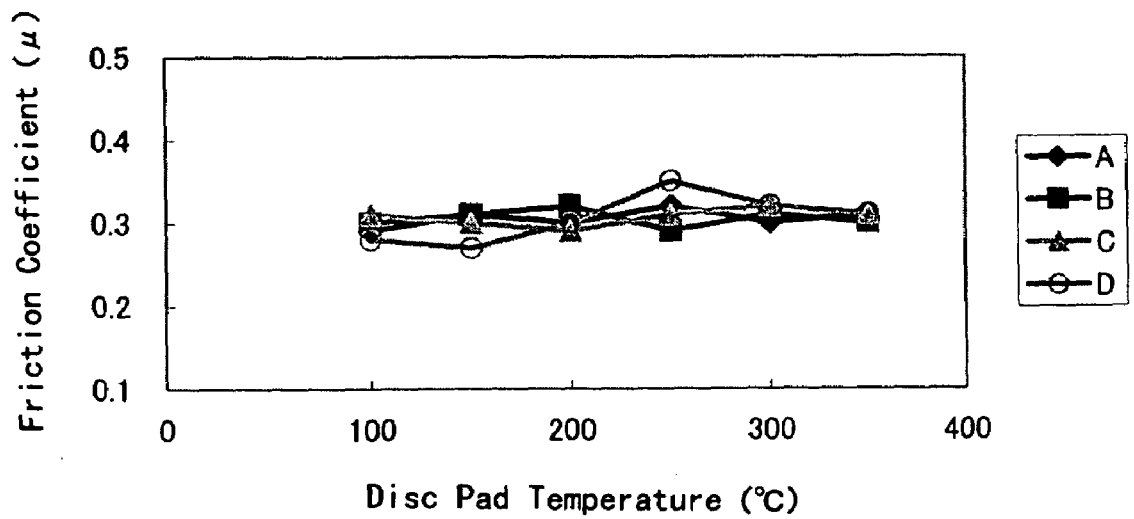
FIG. 2 is a graph showing a relationship between a disc pad temperature and a friction coefficient for the disc pads A–D.

As can be appreciated from FIGS. 1 and 2, the disc pads A to C using KTLOs of the present invention show the reduced wearability, i.e., the superior wear resistance, at a temperature of 300° C. or more, compared with the disc pads D and E. They also show coefficients of friction relatively stabilized against a temperature change.

UTILITY IN INDUSTRY

The present invention provides novel lepidocrocite lithium potassium titanate suitable for use as a friction control agent.

The friction material of the present invention contains lepidocrocite lithium potassium titanate of the present invention as a friction control agent, thereby to exhibit extremely stable frictional wear properties over the low- to high-temperature ranges and to maintain stable frictional wear properties during a long-term use.

The invention claimed is:

1. Lepidocrocite lithium potassium titanate having a composition represented by the formula $K_{0.5-0.7}Li_{0.27}Ti_{1.73}O_{3.85-3.95}$.

2. The lepidocrocite lithium potassium titanate as recited in claim 1, characterized as having an arithmetic mean of major and minor diameters of 0.1–100 µm, a proportion of a major to minor diameter of from 1 to below 10, a mean thickness of 50–5,000 nm and a flaky shape.

3. A method for manufacturing the lepidocrocite lithium potassium titanate as recited in claim 2, characterized as including the steps of adding an acid to an aqueous slurry of lepidocrocite lithium potassium titanate having a composition represented by the formula $K_{0.8}Li_{0.27}Ti_{1.73}O_4$ so that the slurry is adjusted to a pH of 6–8, separating solids from the slurry and calcining the solids.

4. A friction material characterized as containing 1–80% by weight of the lepidocrocite lithium potassium titanate recited in claim 2 as a friction control agent.

5. A method for manufacturing the lepidocrocite lithium potassium titanate as recited in claim 1, characterized as including the steps of adding an acid to an aqueous slurry of lepidocrocite lithium potassium titanate having a composition represented by the formula $K_{0.8}Li_{0.27}Ti_{1.73}O_4$ so that the slurry is adjusted to a pH of 6–8, separating solids from the slurry and calcining the solids.

6. A friction material characterized as containing 1–80% by weight of the lepidocrocite lithium potassium titanate recited in claim 1 as a friction control agent.

* * * * *